United States Patent [19]

Koerner et al.

[11] 3,937,673
[45] *Feb. 10, 1976

[54] MODIFIED AMIDE-IMIDE RESINS AND METHOD OF MAKING THE SAME

[75] Inventors: Ernest C. Koerner; Donny R. Disque, both of Fort Wayne, Ind.

[73] Assignee: Phelps Dodge Industries, Inc., New York, N.Y.

[ * ] Notice: The portion of the term of this patent subsequent to May 20, 1992, has been disclaimed.

[22] Filed: June 3, 1974

[21] Appl. No.: 475,826

Related U.S. Application Data

[63] Continuation-in-part of Ser. No. 399,393, Sept. 21, 1973.

[52] U.S. Cl. .................... 260/18 TN; 260/77.5 AM; 260/77.5 AA
[51] Int. Cl.$^2$.......................................... C08G 18/38
[58] Field of Search ................ 260/77.5 AM, 18 TN, 77.5 AA, 260/2.5 AM; 117/128.4

[56] References Cited
UNITED STATES PATENTS

| | | | |
|---|---|---|---|
| 3,300,420 | 1/1967 | Frey .......................... | 260/77.5 AM |
| 3,314,923 | 4/1967 | Muller et al. ............... | 260/77.5 AM |
| 3,317,480 | 5/1967 | Fetscher et al. ............ | 260/77.5 AM |
| 3,489,696 | 1/1970 | Miller ......................... | 260/77.5 AM |
| 3,622,525 | 11/1971 | Miller ......................... | 260/77.5 AM |
| 3,637,543 | 1/1972 | Kus et al. .................... | 260/2.5 AM |
| 3,779,996 | 12/1973 | Pauze ......................... | 260/77.5 AM |

Primary Examiner—M. J. Welsh

[57] ABSTRACT

A modified completely imidized aromatic polyamide-imide resin which can be applied from conventional phenolic solvents such as cresylic acid, phenols, cresols and the like. The method of the invention includes reacting an aromatic diisocyanate and an aromatic tricarboxylic acid anhydride in an aprotic solvent, modifying the reaction product with an aliphatic dicarboxylic acid, and diluting the same to an appropriate degree with a solvent. Solutions of the resin having relatively low viscosity and a relatively high resin content can also be made by the method of the invention. The modified polyamide-imide resin of the invention has thermal stability and toughness approaching non-modified aromatic polyamide-imide resins and are fully useful as such resins as insulation materials in the electrical industry.

22 Claims, 1 Drawing Figure

FIG. 1

MODIFIED AMIDE-IMIDE RESINS AND METHOD OF MAKING THE SAME

This application is a continuation-in-part of copending application Ser. No. 399,393, filed Sept. 21, 1973.

BACKGROUND OF THE INVENTION

1. Field of the Invention

This invention relates to polyamide-imide resins and modified aromatic polyamide-imide resins, and methods for making the same. More particularly, this invention relates to a method of making a modified aromatic polyamide-imide resin which can be applied as a coating material from solutions thereof, including solutions in conventional phenolic solvents such as cresylic acid, phenols, cresols and the like. The resin has particular usefulness as a magnet wire insulation.

2. Description of the Prior Art

Polyamide-imide resins now enjoy an evergrowing usefulness in the electrical industry as insulation coatings, such as magnet wire insulation. The rate of growth of the use of aromatic polyamide-imide resins has, however, been limited due to the extremely polar, aprotic solvents usually required for their synthesis and application. Whether such prior art resins are manufactured by conventional processes in which aromatic tricarboxylic acid anhydrides are converted into acid halides and reacted with diamines such as methylene dianaline as disclosed in U.S. Pat. No. 3,260,691 and others or made by reacting aromatic tricarboxylic acid anhydrides and aromatic diisocyanates in accordance with the applicant's own U.S. Pat. Application Ser. No. 195,502 now U.S. Pat. No. 3,790,530, or other patents (many of these patents are cited in the aforementioned U.S. patent application), polar, aprotic solvents are required. Such resins have been difficult to apply as even, consistent, smooth coatings on certain substrates because of these solvents. Particular problems have been experienced when application is to fine wire which is difficult to coat, or over base insulation materials, or substrates which may be attacked by the solvents.

In many instances, polyamide-imides are useful as topcoats over a base insulation material (see for an instance U.S. Pat. No. 3,022,200); in some instances the strong polar solvents attack the base insulation material thus downgrading the total insulation rather than upgrading the insulation as would be expected. Additionally, problems have been experienced in using such solvents with conventional magnet wire towers because of the extremely high temperatures which are necessary to expel such solvents from such coatings and their tendency to autoignite at such temperatures.

It is therefore highly desirable to provide a modified aromatic polyamide-imide resin polymerized to a useful molecular weight in solvents of moderate polarity. It is also highly desirable to provide solutions of such resins having relatively low viscosities and relatively high resin contents, and to provide solutions of such resins in conventional phenolic solvents such as cresylic acid, phenols, cresols, and the like from which the same can be applied. It is also desired that such modified polyamide-imide resins will have chemical and electrical properties similar to the completely imidized unmodified polyamide-imide resins as above-described. All of this will be further desirable where conventional phenolic solvents are used inasmuch as substantial savings in solvent cost will be experienced. Most aprotic, polar solvents are at least twice as expensive as the currently commercially available phenolic solvents which are widely used in the magnet wire industry.

The term "polyamide-imide resin" as used herein refers to that group of resins which contain a plurality of amide groups and imide groups therein. The term "unmodified polyamide-imide resins" or "non-modified polyamide-imide resins" as used herein refer to those resins which contain only amide or imide "building blocks" and can be referred to as "homopolymers". The term "modified polyamide-imide resins" as used herein refer to those resins which include groups therein which are not "building blocks" of a "homopolymer".

SUMMARY OF THE INVENTION

It is therefore a primary object of this invention to provide an improved polyamide-imide resin.

It is also a primary object of this invention to provide an improved method of making a modified aromatic polyamide-imide resin and solutions thereof.

Another object of this invention is to provide a modified aromatic polyamide-imide resin which can be applied from solutions in conventional phenolic solvents such as cresylic acid, phenols, cresols, and the like.

Another object of the invention is to provide solutions of an improved polyamide-imide resin having relatively low viscosities and a relatively high solids content.

Another object of this invention is to provide an improved modified aromatic polyamide-imide resin having thermal stability and toughness approaching that of non-modified aromatic polyamide-imide resins and which can be applied from solvents which are less polar than polar, aprotic solvents.

Another object of this invention is to provide an improved polyamide-imide resin which can be applied to fine wire as a smooth and continuous coating.

Yet another object of this invention is to provide a modified aromatic polyamide-imide resin having thermal stability and toughness approaching non-modified homopolymer aromatic polyamide-imide resins and which is less expensive to manufacture and which is less expensive to apply as coatings.

Yet another object of this invention is to provide an improved method of making solutions of a polyamide-imide resin in less polar solvents than polar, aprotic solvents.

Yet another object of this invention is to provide an improved solution of a polyamide-imide resin which can be applied to substrates as a coating and is especially useful as a magnet wire enamel.

Yet another object of this invention is to provide an improved method to modify aromatic polyamide-imide resins with dicarboxylic acids.

A further object of this invention is to provide a modified aromatic polyamide-imide resin having a melting point which is below its decomposition temperature.

In the broader aspects of this invention there is provided an aromatic polyamide-imide resin comprising the reaction product of an aromatic diisocyanate, an aromatic tricarboxylic acid anhydride and an aliphatic dicarboxylic acid. The method of the invention includes reacting aromatic tricarboxylic acid anhydride and an excess of aromatic diisocyanate in aprotic solvents of moderate polarity, subsequent reaction with aliphatic dicarboxylic acid, and diluting the same with additional solvent.

BRIEF DESCRIPTION OF THE DRAWING

The above-mentioned other features and objects of this invention and the manner of attaining them will become more apparent and the invention itself will be best understood by reference to the following description of an embodiment of the invention taken in conjunction with the accompanying drawing, wherein.

DESCRIPTION OF THE SPECIFIC EMBODIMENT

Figure 1:
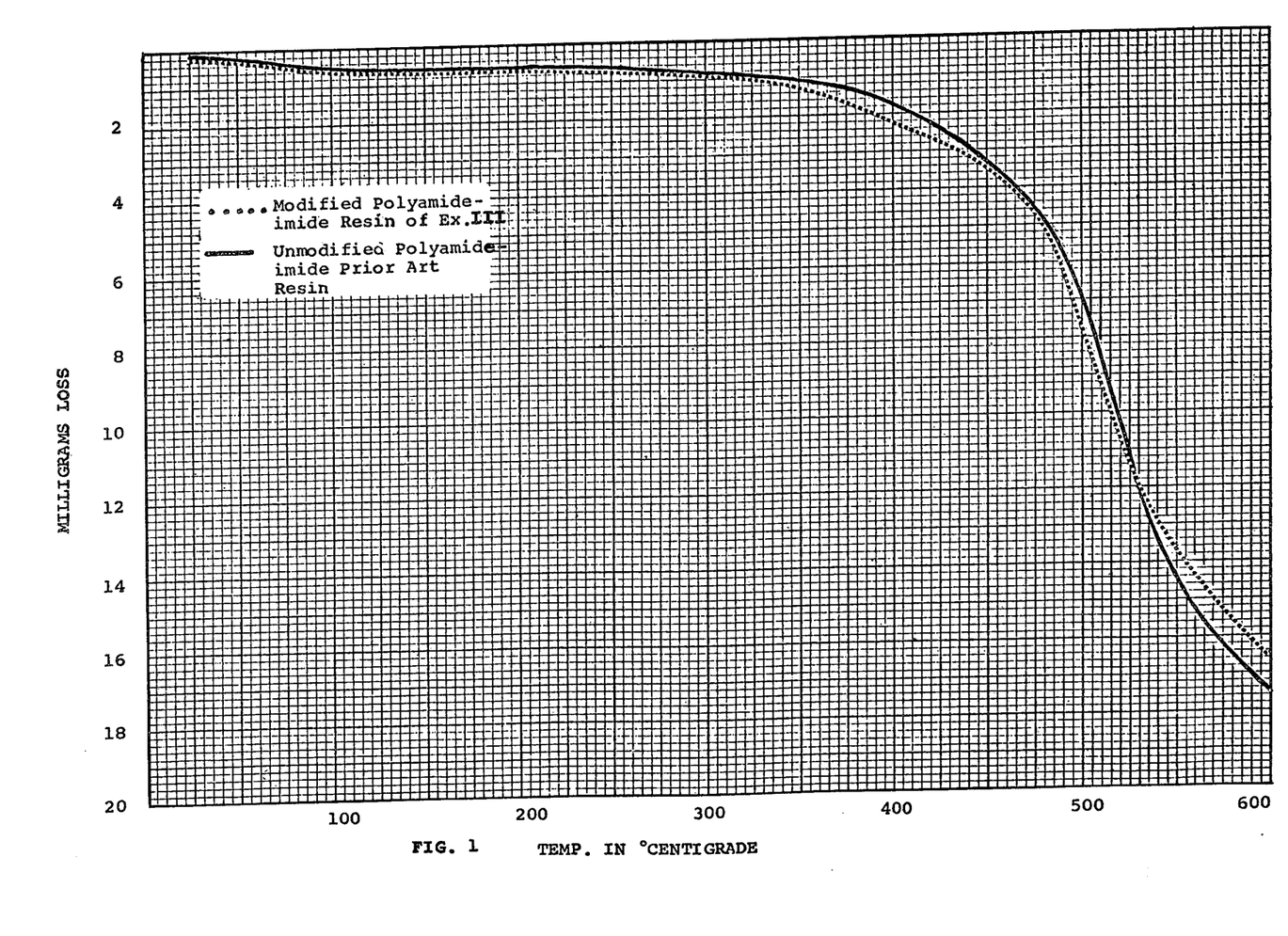
FIG. 1 is a comparison of the thermal stability of a modified polyamide-imide resin of the invention and a prior art non-modified aromatic polyamide-imide resin.

In accordance with the present invention, polyamide-imide resins are formed by reacting essentially stoichiometric amounts of (1) aromatic diisocyanate and (2) aromatic tricarboxylic acid anhydride and aliphatic dicarboxylic acid. From 10 to 50 mol percent of the aromatic tricarboxylic acid anhydride-aliphatic dicarboxylic acid reactant or component may comprise aliphatic dicarboxylic acid, and the remainder being aromatic tricarboxylic acid anhydride.

The method of the invention provides a process for manufacturing such polyamide-imide resins in conventional commercial-sized equipment. The method of the invention may produce a solution of said polyamide-imide resin in solvents such as cresylic acid, phenols, cresols and the like, from which such resins can be applied to substrates. Such solutions may be used as magnet wire coatings applied by conventional wire coating machinery without the coating problems and autoignition problems heretofore experienced when non-modified aromatic polyamide-imide resins are applied with the same machinery from solutions in polar, aprotic solvents.

The method of the invention also provides a process for manufacturing solutions of polyamide-imide resins having relatively low viscosities and relatively high resin content.

It is commonly known, that polyamide-imide resins can be synthesized by reacting aromatic tricarboxylic acid anhydride with an aromatic diisocyanate, as illustrated in the following equations using, for example, trimellitic anhydride and methylene diisocyanate as reactants.

well known to take place in reaction solutions, the solvents of which consist of solvents such as N-methyl pyrrolidone, dimethylacetamide, dimethylformamide, dimethylsulfoxide and the like. Such solvents are those referred to herein as polar, aprotic solvents. The resulting aromatic polyamide-imide resins are characterized by their good thermal stability, toughness, good flexibility and high molecular weight.

By the present invention, it has been found that reactions between aromatic diisocyanates and a substantially equal molar amount of aromatic tricarboxylic acid anhydrides and aliphatic dicarboxylic acids can be carried out to result in a reaction product having a useful molecular weight in solvents of more moderate polarity than the polar, aprotic solvents above-identified. The resulting modified aromatic polyamide-imide resins have properties approaching those of non-modified polyamide-imide resins.

In contrast, in these more moderate solvents, the reaction between trimellitic anhydride and methylene diisocyanate set out hereinabove, for example, would result in reaction products which would be precipitated at a relatively low molecular weight and thereby when applied to a substrate as a coating would form relatively brittle and anemic films.

The solvents of "moderate polarity" or "less polar solvents" which are useful in the invention are those having solvency parameters as set out in Table I of Hanson, Charles M., Product R&D, Vol. 8, No. 1, March 1969, p. 1 at p. 5 within the following ranges: $\delta d$ 8.0 through 10.0, $\delta p$ 0.3 through 4.5, $\delta h$ 0.7 through 4.0 and combinations thereof. Examples of these solvents of moderate polarity and which are useful in the invention include the dichlorobenzenes, ethylene glycol monoethylether acetate, certain aromatic hydrocarbon solvents, acetophenone, phenetole, Bis 2-ethoxy ethylether, anisole, veratrole, and other dimethoxybenzenes, the preferred ones being o-dichlorobenzene and anisole.

The aliphatic dicarboxylic acids which are useful in the invention include all such acids including dimerized dicarboxylic acids having at least 6 carbon atoms, specifically adipic, pimelic, suberic, azelaic, dimerized unsaturated fatty acids and sebacic acids. The term "dimerized unsaturated fatty acids" includes dimerized acids and diacids obtained through polymerization at mid molecule positions of two unsaturated monobasic It is well known that the reaction between an acid or an acid anhydride and an isocyanate is a vigorous reaction which is difficult to control. Processes that have been developed heretofore have been difficult to control in commercial-sized equipment where agitation, temperature and viscosity control and other control techniques, possible in laboratory glassware are not readily applicable. The invention provides a method of making polyamide-imide resins in commercial-sized equipment without the control problems experienced heretofore in prior art processes.

Further, synthesis of aromatic polyamide-imide resins in accordance with the equation above set-out are acids having about 18 carbons, such as oleic, elaidic acids.

Suitable diisocyanates which are useful in the invention include diisocyanates having a nucleus such as benzene, naphthalene, diphenylalkane having 1 to 3 carbon atoms between rings, diphenylether, diphenylketone, cycloalkane with 5 to 7 carbon atoms in the ring, and specifically include:

1,4-phenylenediisocyanate
2,5-tolylenediisocyanate
3,5-tolylenediisocyanate
1-methoxy-2,4-phenylenediisocyanate
1,3,5-triethyl-2,4-phenylenediisocyanate 1-methyl-3,5-diethyl-6-chloro-2,4-phenylenediisocyanate
p-xylylenediisocyanate
benzophenone-4,4'-diisocyanate
1,4-naphthylenediisocyanate
4,4'-diisocyanate-diphenyldimethylmethane
4,4'-diisocyanate-3,3'-dimethyldiphenylmethane
1,5-naphthylenediisocyanate
4,4'-diisocyanate-3,3'-dichlorodiphenylmethane
4,4'-diisocyanate-diphenylether and 2,4-diisocyanatediphenylether
1,3-phenylenediisocyanate
3,3'-dimethoxy-4,4'-biphenylenediisocyanate
3,3'-diethoxy-4,4'-biphenylenediisocyanate
2,4-tolylenediisocyanate
2,6-tolylenediisocyanate
4-chloro-1,3-phenylenediisocyanate
4,4'-biphenylenediisocyanate
3,3'-dimethyl-4,4'-biphenylenediisocyanate
m-xylylenediisocyanate
1-methyl-3,5-diethyl-2,4-phenylenediisocyanate
diphenyl-4,4-diisocyanate
diphenyl methane-4,4-diisocyanate
4,4-dimethyldiphenyl methane-2,2-diisocyanate
4-methoxy-1,3-phenylene diisocyanate
4 isopropyl-1,3,phenylene diisocyanate
durylene diisocyanate
3,3'-bitolylene-4,4 diisocyanate
1-methyl-3,5-diethyl-2,6-phenylenediisocyanate
4,4'-diisocyanate-2,2-diphenylpropane
4,4'-diisocyanate-diphenylmethane
4,6-dimethyl-1,3-xylylene diisocyanate
4,4'-diisocyanate-diphenyl
meta-phenylenediisocyanate
and combinations thereof.

The tricarboxylic acid anhydrides which have usefulness in the invention include trimellitic anhydride; hemimellitic anhydride; methyltrimellitic anhydride; 4'carboxy diphenyl 3,4 dicarboxylic anhydride; 1,2,4 benzene tricarboxylic anhydride; 3,4,6 and 1,3,8 naphthalene tricarboxylic anhydride; 1,2,7 anthracene tricarboxylic anhydride; and combinations thereof.

The method of the invention includes first reacting the aromatic tricarboxylic acid anhydride and an excess of aromatic diisocyanates in a reaction solution containing more than 50% weight acid anhydride and diisocyanate. As soon as a clear solution is obtained, the aliphatic dicarboxylic acid is slowly added and the reaction is allowed to continue for about 45 minutes at 200°C. or for about 130 minutes at 150°C. or at equivalent intermediate time/temperature reaction conditions, after reflux is again initiated. The reaction above 200°C. takes place so fast that it is difficult to control, and not preferred. The reaction is then quenched by diluting the reaction solution with an appropriate amount of solvent to a 20–45% weight resin solution by adding an appropriate amount of additional solvent which may be polar, aprotic solvents or less polar solvents, or phenolic solvents such as cresylic acid, phenol, cresol, or the like. Using trimellitic anhydride, adipic acid and methylene diisocyanate as examples of the tricarboxylic acid anhydride, the aliphatic dicarboxylic acid and the aromatic diisocyanate of the invention, the reaction is schematically, but not necessarily quantatively, believed to occur as follows:

It has been found that there are certain critical limitations to the invention. First, the amount of the aliphatic dicarboxylic acid must be at least 10 mol percent of the aromatic tricarboxylic acid anhydride component and have at least 6 carbon atoms to build an appreciable molecular weight. Too little of or too small an acid results in a low molecular weight polymer or a prepolymer. Additionally, the dicarboxylic acid must be no greater than 50 mol percent of the tricarboxylic acid anhydride or else the reaction product tends to be less soluble than desired in the solvents of the invention. Also, the dicarboxylic acid must be added last to the reaction solution, otherwise the result will be not only reaction products which are less soluble in the solvents of the invention, but will result in less flexible coatings.

In accordance with the invention, while substantially stoichiometric amounts of aromatic diisocyanate and aromatic tricarboxylic acid anhydride and aliphatic dicarboxylic acid are reacted, excesses of diisocyanate can be tolerated if the solvent finally added in accordance with the method of the invention is a phenolic solvent such as cresylic acid, phenols, cresols and the like. This is unlike conventional reactions between aromatic diisocyanates and aromatic tricarboxylic acid anhydrides as set out in the prior art. The reason for this is that addition of solvent such as phenol, cresols, cresylic acid and the like will block any isocyanate groups formed by an excess of diisocyanate. Unblocking will occur when the material is applied as a coating and appropriately baked to a non-tacky coating. However, a large amount of excess diisocyanate will result in cross-linked, less flexible coatings. Particularly in the use of the resins of the invention as magnet wire insulations, reactions involving excess diisocyanates may not be preferred inasmuch as they lead to less flexible coatings. However, in other applications such less flexible coatings may well be preferred and by the invention are possible.

The following examples illustrate the present invention.

EXAMPLE I

A solution is formed by mixing 180.0 grams trimellitic acid anhydride and 390.0 grams p-p'diphenyl methane diisocyanate in 652.5 grams o-dichlorobenzene by heating the mixture. At approximately 150°C. a clear and homogeneous solution is obtained. Once clarity is obtained, 82.5 grams of adipic acid is added slowly. The temperature of the mixture is raised to approximately 180°C. and slow reflux is maintained. After approximately 40 minutes, a yellow viscous resin is obtained and 961.2 grams of phenol are added to quench and stop the reaction. The solution is maintained at 130°C. until all the resin is dissolved. The resultant solution is cooled to room temperature and filtered. The viscosity of the product at 25°C. was measured at about 1100 cps, utilizing a Brookfield viscometer, and a resin solution of approximately 30% weight resin and 70% weight product.

The resultant solution was then applied in eight consecutive coats to a bare copper conductor, employing dies and a conventional wire coating tower having bank temperatures of 850°–800°–600°F. The properties of the resultant magnet wire are presented in Tables I, II, and III.

EXAMPLE II

A solution is formed by mixing 60.0 grams of trimellitic acid anhydride and 132.0 grams of p,p′ diphenyl methane diisocyanate and 110.0 grams of cellosolve acetate and 4.8 grams of phenol by heating the mixture. At approximately 145°C. a clear, homogeneous solution is obtained. Once clarity is obtained 27.0 grams of adipic acid is added slowly. The temperature of the mixture is raised to approximately 160°C. and slow reflux is maintained. After approximately 100 minutes, a brownish-yellow viscous resin is obtained and 396.2 grams of phenol are added to quench and stop the reaction. The solution is maintained at 130°C. until all the resin is dissolved. The resultant solution is cooled to room temperature and filtered. The viscosity of the product at 25°C. was measured at about 890 cps, utilizing a Brookfield viscometer, and a resin solution of approximately 30% weight resin.

The resultant solution was then applied in eight consecutive coats to a bare copper conductor, employing dies and a conventional wire coating tower having bank temperatures of 850°–800°–600°F. The properties of the resultant magnet wire are presented in Table I.

EXAMPLE III

A solution is formed by mixing 60.0 grams of trimellitic acid anhydride and 135.0 grams of p,p′diphenyl methane diisocyanate and 110.0 grams of Anisole and 4.8 grams of phenol by heating the mixture. At approximately 170°C. a clear, homogeneous solution is obtained. Once clarity is obtained 27.0 grams of adipic acid are added slowly. The temperature of the mixture is raised to approximately 170°C. and slow reflux is maintained. After approximately 120 minutes, a yellow viscous resin is obtained and 55.5 grams of cumene and 346.5 grams of phenol are added to quench and stop the reaction. The solution is maintained at 130°C. until all the resin is dissolved. The resultant solution is cooled to room temperature and filtered. The viscosity of the product at 25°C. was measured at about 1200 cps, utilizing a Brookfield viscometer, and a resin solution of approximately 30% weight resin.

The resultant solution was then applied in eight consecutive coats to a bare copper conductor, employing dies and a conventional wire coating tower having bank temperatures of 850°–800°–600°F. The properties of the resultant magnet wire are presented in Table I.

EXAMPLE IV

A solution is formed by mixing 60.0 grams of trimellitic acid anhydride and 130.0 grams of p,p′ diphenyl methane diisocyanate and 110.0 grams of Bis 2-ethoxy ethylether and 4.8 grams of phenol by heating the mixture. At approximately 135°C. a clear, homogeneous solution is obtained. Once clarity is obtained 27.0 grams of adipic acid is added slowly. The temperature of the mixture is raised to approximately 190°C. and slow reflux is maintained. After approximately 45 minutes, a brownish viscous resin is obtained and 346.2 grams of phenol are added to quench and stop the reaction. The solution is maintained at 130°C. until all the resin is dissolved. The resultant solution is cooled to room temperature and filtered. The viscosity of the product at 25°C. was measured at about 210 cps, utilizing a Brookfield viscometer, and a resin solution of approximately 30% weight resin.

EXAMPLE V

A solution is formed by mixing 180.0 grams of trimellitic acid anhydride and 390.0 grams of p,p′ diphenyl methane diisocyanate and 652.5 grams of o-dichlorobenzene by heating the mixture. At approximately 155°. a clear, homogeneous solution is obtained. Once clarity is obtained 106.3 grams of azelaic acid is added slowly. The temperature of the mixture is raised to approximately 180°C. and slow reflux is maintained. After approximately 50 minutes, a yellow viscous resin is obtained and 434.0 grams of phenol are added to quench and stop the reaction. The solution is maintained at 130°C. until all the resin is dissolved. The resultant solution is cooled to room temperature and filtered. The viscosity of the product at 25°C. was measured at about 1250 cps, utilizing a Brookfield viscometer, and a resin solution of approximately 30% weight resin.

The resultant solution was then applied in eight consecutive coats to a bare copper conductor, employing dies and a conventional wire coating tower having bank temperatures of 850°–800°–600°F. The properties of the resultant magnet wire are presented in Table II.

EXAMPLE VI

A solution is formed by mixing 81.6 grams of trimellitic acid anhydride and 130.0 grams of p,p′ diphenyl methane diisocyanate and 222.6 grams of o-dichlorobenzene by heating the mixture. At approximately 160°C. a clear, homogeneous solution is obtained. Once clarity is obtained 11.0 grams of adipic acid are added slowly. The temperature of the mixture is raised to approximately 180°C. and slow reflux is maintained. After approximately 40 minutes, a yellow viscous resin is obtained and 296.8 grams of phenol are added to quench and stop the reaction. The solution is maintained at 130°C. until all the resin is dissolved. The resultant solution is cooled to room temperature and filtered. The viscosity of the product at 25°C. was measured at about 2200 cps, utilizing a Brookfield viscometer and a resin solution of approximately 30% weight resin.

The resultant solution was then applied in eight consecutive coats to a bare copper conductor, employing dies and a conventional wire coating tower having bank temperatures of 850°–800°–600°F. The properties of the resultant magnet wire are presented in Table III.

EXAMPLE VII

A solution is formed by mixing 72.0 grams of trimellitic acid anhydride and 130.0 grams of p,p′diphenyl methane diisocyanate and 220.25 grams of o-dichlorobenzene by heating the mixture. At approximately 165°C. a clear, homogeneous solution is obtained.

Once clarity is obtained 18.25 grams of adipic acid is added slowly. The temperature of the mixture is raised to approximately 165°C. and slow reflux is maintained. After approximately 35 minutes, a yellow viscous resin is obtained and 220.25 grams of phenol are added to quench and stop the reaction. The solution is maintained at 130°C. until all the resin is dissolved. The resultant solution is cooled to room temperature and filtered. The viscosity of the product at 25°C. was measured at about 1400 cps, utilizing a Brookfield viscometer, and a resin solution of approximately 30% weight resin.

The resultant solution was then applied in eight consecutive coats to a bare copper conductor, employing dies and a conventional wire coating tower having bank temperatures of 850°–800°–600°F. The properties of the resultant magnet wire are presented in Table III.

EXAMPLE VIII

A solution is formed by mixing 48.0 grams of trimellitic acid anhydride and 130.0 grams of p,p' diphenyl methane diisocyanate and 214.5 grams of O-dichlorobenzene by heating the mixture. At approximately 165°C. a clear, homogeneous solution is obtained. Once clarity is obtained 36.5 grams of adipic acid are added slowly. The temperature of the mixture is raised to approximately 165°C. and slow reflux is maintained. After approximately 50 minutes, a yellow viscous resin is obtained and 286.0 grams of phenol are added to quench and stop the reaction. The solution is maintained at 130°C. until all the resin is dissolved. The resultant solution is cooled to room temperature and filtered. The viscosity of the product at 25°C. was measured at about 2000 cps, utilizing a Brookfield viscometer, and a resin solution of approximately 30% weight resin.

The resultant solution was then applied in eight consecutive coats to a bare copper conductor, employing dies and a conventional wire coating tower having bank temperatures of 850°–800°–600°F. The properties of the resultant magnet wire are presented in Table III.

EXAMPLE IX

A solution is formed by mixing 38.4 grams of trimellitic acid anhydride and 132.5 grams of p,p' diphenyl methane diisocyanate and 214.7 grams of o-dichlorobenzene by heating the mixture. At approximately 160°C. a clear, homogeneous solution is obtained. Once clarity is obtained 43.8 grams of adipic acid is added slowly. The temperature of the mixture is raised to approximately 160°C. and slow reflux is maintained. After approximately 35 minutes, a viscous resin is obtained and 486.3 grams of phenol are added to quench and stop the reaction. The solution is maintained at 130°C. until all the resin is dissolved. The resultant solution is cooled to room temperature and filtered. The viscosity of the product at 25°C. was measured at about 200 cps, utilizing a Brookfield viscometer, and a resin solution of approximately 30% weight resin.

The resultant solution was then applied in eight consecutive coats to a bare copper conductor, employing dies and a conventional wire coating tower having bank temperatures of 850°–800°–600°F. The properties of the resultant magnet wire are presented in Table III.

EXAMPLE X

A solution is formed by mixing 28.8 grams of trimellitic acid anhydride and 132.5 grams of p,p'diphenyl methane diisocyanate and 212.4 grams of o-dichlorobenzene by heating the mixture. At approximately 170°C. a clear, homogeneous solution is obtained. Once clarity is obtained 51.1 grams of adipic acid is added slowly. The temperature of the mixture is raised to approximately 170°C. and slow reflux is maintained. After approximately 30 minutes, a yellow viscous resin is obtained and 283.2 grams of phenol are added to quench and stop the reaction. The solution is maintained at 130°C. until all the resin is dissolved. The resultant solution is cooled to room temperature and filtered. The viscosity of the product at 25°C. was measured at about 200 cps, utilizing a Brookfield viscometer, and a resin solution of approximately 30% weight resin.

The resultant solution was then applied in eight consecutive coats to a bare copper conductor, employing dies and a conventional wire coating tower having bank temperatures of 850°–800°–600°F. The properties of the resultant magnet wire are presented in Table III.

EXAMPLE XI

A solution is made by mixing 192.0 grams of trimellitic acid anhydride and 520.0 grams of p,p' diphenyl methane diisocyanate in 598.0 grams of o-dichlorobenzene. The mixture is then heated to about 160°C. where it turns into a clear yellow homogeneous solution. 146 grams of adipic acid are slowly added to the solution at this time. After approximately one hour at about 160°C., the polymer becomes very viscous. When this occurs, the polymer is taken out of the reactor and quickly cooled. The polymer is vacuum dried at 150°C. to remove o-dichlorobenzene and cooled to 25°C. and ground into a powder. This powder is useful as a fusible powder and may be applied to substrates by conventional techniques.

EXAMPLE XII

A solution is formed by mixing 172.8 grams of trimellitic acid anhydride and 257.2 grams of p,p' diphenyl methane diisocyanate and 260 grams of Anisole and 15.0 grams of NJ–100 aromatic solvent, as sold by Hoosier Solvents and Chemicals Corp. of Fort Wayne, Ind., by heating the mixture. At approximately 135°C. a clear, homogeneous solution is obtained. Once clarity is obtained 56.5 grams of "1010 dimer" dimerized, unsaturated fatty acid, as sold by Emery Industries, Inc. of Cincinnati, Ohio, are added slowly. The temperature of the mixture is raised to approximately 160°C. and slow reflux is maintained. After approximately 180 minutes, a yellow viscous resin is obtained and 455.5 grams of cresylic acid and 455.5 grams of phenol, previously mixed, (911.0 grams in total) are added to quench and stop the reaction. The solution is maintained at 135°C. until all the resin is dissolved. The resultant solution is cooled to room temperature and filtered. The viscosity of the product at 25°C. was measured at about 900 cps, utilizing a Brookfield viscometer, and a resin solution of approximately 25% weight resin.

The resultant solution was then applied in eight consecutive coats to a bare copper conductor, employing dies and a conventional wire coating tower having bank temperatures of 850°–800°–600°F. The properties of the resultant magnet wire are presented in Tables II and III.

EXAMPLE XIII

A solution is formed by mixing 128.6 grams of trimellitic acid anhydride and 257.5 grams of p,p' diphenyl methane diisocyanate and 109.0 grams of acetophenone by heating the mixture. At approximately 135°C. a clear homogeneous solution is obtained. Once clarity is obtained 48.0 grams of adipic acid are added slowly. The temperature of the mixture is raised to approximately 180°C. and slow reflux is maintained. After approximately 60 minutes, a yellow viscous resin is obtained and 530.5 grams of cresylic acid and 530.5 grams of phenol, previously mixed, (1061.0 grams in total) are added to quench and stop the reaction. The solution is maintained at 135°C. until all the resin is dissolved. The resultant solution is cooled to room temperature and filtered. The viscosity of the product at 25°C. was measured at about 3000 cps, utilizing a Brookfield viscometer, and a resin solution of approximately 25% weight resin.

The resultant solution was then applied in eight consecutive coats to a bare copper conductor, employing dies and a conventional wire coating tower having bank temperatures of 850°-800°-600°F. The properties of the resultant magnet wire are presented in Table I.

EXAMPLE XIV

A solution is formed by mixing 172.7 grams of trimellitic acid anhydride and 334.1 grams of p,p' diphenyl methane diisocyanate in 334.1 grams of NJ-100 aromatic solvent, as sold by Hoosier Solvents and Chemicals Corp. of Fort Wayne, Ind., 7.62 grams phenol and 19.3 grams xylol. The mixture was then heated to about 150°C. where it turned into a homogeneous solution. 56.3 grams of adipic acid are slowly added to the solution at this time. After approximately 1 hour at about 150° to 160°C. the polymer becomes very viscous. When this occurs, 408.3 grams of cresylic acid and 408.3 grams of phenol, previously mixed, (816.6 grams in total) are added to quench and stop the reaction. The resultant solution is cooled to room temperature and NJ-100 aromatic solvent is added to the mixture such that the solution is approximately 25% weight resin.

The resultant solution was then applied in eight consecutive coats to a bare copper conductor, employing dies and a conventional wire coating tower having bank temperatures of 800°-710°-560°F. The properties of the resultant magnet wire are presented in Table I.

TABLE I

PHYSICAL, THERMAL AND ELECTRICAL PROPERTIES OF THE IMPROVED POLYAMIDE-IMIDE RESIN OF THE INVENTION SYNTHESIZED IN VARIOUS SOLVENTS AND APPLIED TO AWG 18 WIRE AS A MAGNET WIRE INSULATION

| T.P. NO. | Example Number | I | II | III | XIII | XIV |
|---|---|---|---|---|---|---|
|  | PHYSICAL PROPERTIES: |  |  |  |  |  |
| 1 | Build, mils | 3.0–3.1 | 2.8–3.0 | 2.9–3.1 | 2.8–3.0 | 3.0–3.1 |
| 13 | Snap | OK | OK | OK | OK | OK |
| 2 | Flexibility, IX, 20% | Pass | Pass | Pass | Pass 10% | Pass |
| 32 | Repeated Scrape | 152 | 160 | 79 | 130 | 142 |
|  | THERMAL PROPERTIES: |  |  |  |  |  |
|  | Techrand OFM | 9.0 | 6.9 | 9.3 | 7.0 | 8.7 |
| 16 | NEMA Cut-Thru | 349 | 322 | 348 | 316 | 336 |
|  | ELECTRICAL PROPERTIES: |  |  |  |  |  |
| 40 | Dielectric R.T. | 7,900 V | 9,030 V | 10,900 V | 7,500 V |  |
|  | IEEE Life | 180°C. |  | 180°C. |  |  |

TABLE II

PHYSICAL, THERMAL AND ELECTRICAL PROPERTIES OF THE IMPROVED POLYAMIDE-IMIDE RESIN OF THE INVENTION MADE WITH VARIOUS DICARBOXYLIC ACIDS AND APPLIED TO AWG 18 WIRE AS A MAGNET WIRE INSULATION

| T.P. NO. | Example Number | I | V | XII |
|---|---|---|---|---|
|  | PHYSICAL PROPERTIES: |  |  |  |
| 1 | Build, mils | 3.0–3.1 | 2.6–3.1 | 2.8–3.0 |
| 13 | Snap | OK | OK | OK |
| 2 | Flexibility, IX, 20% | Pass | Pass | Pass |
| 32 | Repeated Scrape | 152 | 61 | 105 |
|  | THERMAL PROPERTIES: |  |  |  |
|  | Techrand OFM | 9.0 | 8.3 | 7.9 |
| 16 | NEMA Cut-Thru | 349 | 368 | 346 |
|  | ELECTRICAL PROPERTIES: |  |  |  |
| 40 | Dielectric R.T. | 7,9000 V | 9,915 V | 7,100 V | the resultant magnet wire are presented in Table I.

TABLE III

PHYSICAL, THERMAL AND ELECTRICAL PROPERTIES OF THE IMPROVED POLYAMIDE-IMIDE RESIN OF THE INVENTION MADE WITH VARIOUS PERCENTAGES OF ADIPIC ACID AND APPLIED TO AWG 18 WIRE AS A MAGNET WIRE INSULATION

| Example Number | | VI | VII | I | VIII | IX | X | XII |
|---|---|---|---|---|---|---|---|---|
| T.P. NO. | PHYSICAL PROPERTIES: | | | | | | | |
| 1 | Build, mils | 3.4–4.2 | 3.0–3.3 | 3.0–3.1 | 3.1–3.2 | 3.0–3.3 | 3.1–3.3 | 2.8–3.0 |
| 13 | Snap | OK | OK | OK | OK | OK | OK | OK |
| 2 | Flexibility IX, 20% | 10% IX | Pass | Pass | Pass | Pass | Pass | Pass |
| 32 | Repeated | 183 | 176 | 152 | 156 | 52 | 50 | 105 |
| | THERMAL PROPERTIES: | | | | | | | |
| | Techrand OFM | 9.7 | 8.9 | 9.0 | 5.6 | 4.8 | 5.4 | 7.9 |
| 16 | NEMA Cut-Thru | 380 | 372 | 349 | 341 | 314 | 298 | 346 |
| | ELECTRICAL PROPERTIES: | | | | | | | |
| 40 | Dielectric R.T. | 3,000 V | 7,700 V | 7,900 V | 12,065 V | 6,030 V | 5,100 V | 7,100 V |

OTHER EXAMPLES

In each of the above examples a particular aromatic tricarboxylic acid anhydride and a particular aromatic diisocyanate and a particular aliphatic dicarboxylic acid are reacted in a particular solvent and a particular solvent is used to quench and stop the reaction. It is to be understood that in each of the examples, any one or any possible mixture of any of the aromatic tricarboxylic acid anhydrides indicated hereinabove to be useful in the performance of the invention can be substituted, in the same molar amount, for the aromatic tricarboxylic acid anhydride of the example. The same can be said for the aromatic diisocyanate and the aliphatic dicarboxylic acid used in each of the examples above and the aromatic diisocyanates and the aliphatic dicarboxylic acids mentioned above, also. Additionally, any of the above-mentioned solvents of moderate polarity or any combination thereof can be used in place of the solvent of the example. Also other mixtures of reactants and solvents may be the subject of still other examples so long as the aliphatic dicarboxylic acid reactant is at least about 10 mol percent and not greater than about 50 mol percent of the aromatic tricarboxylic acid anhydride reactant, and the percent weight of all of the reactants in the reaction solution prior to the quenching thereof with additional solvent, is never less than about 50% weight and never greater than about 85% weight reactants.

It should be understood that with regard to all of the above examples, the heating of the reaction solution prior to quenching and stopping the reaction, is carried out at a reasonable rate, for example about 2°C. per minute. While it is believed that the rate at which the reaction solution is raised in temperature is not critical, extremely slow rates which would materially alter the time/temperature reaction conditions of the invention are not desired. Similarly, the rate at which the dicarboxylic acid is added to the reaction solution is at a relatively slow rate, for example, in 5 equal portions. Again, while the rate of addition of the acid reactant is not believed to be critical, extreme deviations from this rate are not desired.

Each of the Examples I through XIV and the "Other Examples" relating thereto result in resin solutions containing 25% or 30% weight resins. However, as above-mentioned, the method of the invention allows resin solutions having relatively low viscosities and relatively high resin content to be manufactured. These solutions may be manufactured in accordance with the invention either by quenching and stopping the reaction of any of the above examples by using less solvent or by forming a resin powder in accordance with the method taught by Example XI and dissolving the resin in an appropriate amount of solvent. The formation of a powdered resin is possible with all of the reactions of the invention by the procedure taught in Example XI. The only limitation to forming resin solutions having a high resin content by this procedure is that enough solvent must be added to the resin to dissolve the resin and form a solution. The amount of solvent will vary with the solvent used. Similarly if the method taught by Examples I through XI is used to form resin solutions having a relatively high resin content, the only limitations on the procedure are that enough solvent must be used to stop the reaction and to form a resin solution. In general, the reaction will be stopped so long as the quench results in the reaction solution being cooled to less than 150°C. But again, to dissolve the resin formed and to form a solution an appropriate amount of solvent must be used and the amount of solvent will vary with the particular solvent used.

The present invention provides an improved polyamide-imide resin, an improved method of producing polyamide-imide resins, and an improved polyamide-imide resin solution meeting all of the above-listed objects of the invention. The polyamide-imide resins of the invention are preferred over prior art unmodified polyamide-imide resins inasmuch as they can be applied relatively easily from solutions as smooth and continuous coatings. Such coatings can be applied to wire using conventional magnet wire coating machinery using solutions in conventional phenolic solvents. Using the polyamide-imide resins of the invention, improved coating characteristics have been experienced when applying the same as magnet wire insulation to fine wire. Using solutions in conventional phenolic solvents such as cresylic acid, phenols, cresols and the like, such resins have been applied as magnet wire insulation without experiencing solvent autoignition as heretofore experienced in the application of unmodified polyamide-imide resins with conventional wire coating machinery and polar, aprotic solvents. The invention also results in substantial savings to manufacturers of magnet wire inasmuch as conventional phenolic solvents such as cresylic acid, phenols, cresols and the like generally can be purchased for less than half of the purchase price of polar, aprotic solvents.

The process of the invention allows the modified polyamide-imide resins of the invention to be manufactured relatively easy in commercial-sized equipment. The method of the invention further has all of the advantages of the prior art methods of making unmodified polyamide-imide resins from tricarboxylic acid anhydrides and diisocyanates and none of the disadvantages of the prior art method by which such resins are made from tricarboxylic acid anhydrides and diamines.

While there have been described above the principles of this invention in connection with specific reactants, reaction conditions, and the like, it is to be clearly understood that this description is made only by way of example and not as a limitation to the scope of the invention.

What is claimed is:

1. A composition of matter comprising the reaction product of aromatic tricarboxylic acid anhydride reactant and aromatic diisocyanate reactant and aliphatic dicarboxylic acid reactant having more than 6 carbon atoms reacted in a reaction solution comprising aprotic solvent having solvency parameters within the following ranges: $\delta d$ 8.0 through 10.0, $\delta p$ 0.3 through 4.5, $\delta h$ 0.7 through 4.0 and said reactants at a temperature ranging from about 150°C. to about 200°C., said reactants being a major portion of said reaction solution, said dicarboxylic acid reactant being present in an amount which is greater than about 10 mol percent and less than about 50 mol percent of said anhydride reactant.

2. The composition of claim 1 wherein said anhydride reactant is of the group consisting of trimellitic anhydride; hemimellitic anhydride; methyltrimellitic anhydride; 4'carboxy diphenyl 3,4 dicarboxylic anhydride; 1,2,4 benzene tricarboxylic anhydride; 3,4,6 and 1,3,8 naphthalene tricarboxylic anhydride; 1,2,7 anthracene tricarboxylic anhydride; and combinations thereof.

3. The composition of claim 1 wherein said diisocyanates reactant is of the group consisting of:
1,4-phenylenediisocyanate
2,5-tolylenediisocyanate
3,5-tolylenediisocyanate
1-methoxy-2,4-phenylenediisocyanate
1,3,5-triethyl-2,4-phenylenediisocyanate
1-methyl-3,5-diethyl-6-chloro-2,4-phenylenediisocyanate
p-xylylenediisocyanate
benzophenone-4,4'-diisocyanate
1,4-naphthylenediisocyanate
4,4'-diisocyanate-diphenyldimethylmethane
4,4'-diisocyanate-3,3'-dimethyldiphenylmethane
1,5-naphthylenediisocyanate
4,4'-diisocyanate-3,3'-dichlorodiphenylmethane
4,4'-diisocyanate-diphenylether and 2,4-diisocyanatediphenylether
1,3-phenylenediisocyanate
3,3'-dimethoxy-4,4'-biphenylenediisocyanate
3,3'-diethoxy-4,4'-biphenylenediisocyanate
2,4-tolylenediisocyanate
2,6-tolylenediisocyanate
4-chloro-1,3-phenylenediisocyanate
4,4'-biphenylenediisocyanate
3,3'-dimethyl-4,4'-biphenylenediisocyanate
m-xylylenediisocyanate
1-methyl-3,5-diethyl-2,4-phenylenediisocyanate
diphenyl-4,4-diisocyanate
dipehnyl methane-4,4-diisocyanate
4,4-dimethyldiphenyl methane-2,2-diisocyanate
4-methoxy-1,3-phenylene diisocyanate
4 isopropyl-1,3,phenylene diisocyanate
durylene diisocyanate
3,3'-bitolylene-4,4 diisocyanate
1-methyl-3,5-diethyl-2,6-phenylenediisocyanate
4,4'-diisocyanate-2,2-diphenylpropane
4,4'-diisocyanate-diphenylmethane
4,6-dimethyl-1,3-xylylene diisocyanate
4,4'-diisocyanate-diphenyl
meta-phenylenediisocyanate
and combinations thereof.

4. The composition of claim 1 wherein said acid reactant is of the group consisting of adipic, pimelic, suberic, azelaic dimerized unsaturated fatty acids and sebacic acids and combinations thereof.

5. The composition of claim 1 wherein said solvent is of the group consisting of dichlorobenzenes, ethylene glycol monoethylether acetate, acetophenone, phenetole, Bis 2-ethoxy ethylether anisole, veratrole, and combinations thereof.

6. The composition of claim 1 wherein said diisocyanate reactant is present in said reaction solution in excess.

7. The composition of claim 1 wherein the total molar amount of said anhydride and acid reactant is substantially equal to the molar amount of said diisocyanate reactant.

8. The composition of claim 1 which when applied as a magnet wire insulation on a bare AWG 18 gauge copper wire by conventional wire coating machinery in eight passes to a 3 mil build from a cresol solution thereof has the following minimum properties: flexibility, at least 20% IX; NEMA Cut-Through, at least 300°C.; Techrand OFM, at least 5; IEEE Life, at least 180°C.

9. The composition of claim 1 wherein said acid reactant is present in said solution in an amount which is greater than about 20 mol percent and less than about 40 mol percent of said anhydride reactant.

10. A method comprising dissolving aromatic tricarboxylic acid anhydride and an excess of aromatic diisocyanate in aprotic solvent thereby to form a reaction solution, reacting said anhydride and diisocyanate, dissolving aliphatic dicarboxylic acid in said solution, said dicarboxylic acid having more than 6 carbon atoms, and reacting said dicarboxylic acid with said anhydride and diisocyanate.

11. The method of claim 10 wherein said anhydride-diisocyanate reacting step is accomplished at from about 135°C.

12. The method of claim 10 wherein said acid reacting step is accomplished from about 150°C. to about 200°C.

13. The method of claim 10 wherein said acid reacting steps are accomplished at from about 150°C. for about 130 minutes to about 200°C. for about 40 minutes.

14. The method of claim 10 wherein imide groups are formed by said anhydride-diisocyanate reacting step, and both aliphatic and aromatic amide groups are formed by said acid reacting step.

15. The method of claim 10 wherein said anhydride is chosen from the group consisting of trimellitic anhydride; hemimellitic anhydride; methyltrimellitic anhydride; 4'carboxy diphenyl 3,4 dicarboxylic anhydride; 1,2,4 benzene tricarboxylic anhydride; 3,4,6 and 1,3,8 naphthalene tricarboxylic anhydride; 1,2,7 anthracene tricarboxylic anhydride; and combinations thereof.

16. The method of claim 10 wherein said diisocyanate is chosen from the group consisting of
1,4-phenylenediisocyanate
2,5-tolylenediisocyanate
3,5-tolylenediisocyanate 1-methoxy-2,4-phenylenediisocyanate
1,3,5-triethyl-2,4-phenylenediisocyanate
1-methyl-3,5-diethyl-6-chloro-2,4-phenylenediisocyanate
p-xylylenediisocyanate
benzophenone-4,4'-diisocyanate
1,4-naphthylenediisocyanate
4,4'-diisocyanate-diphenyldimethylmethane
4,4'-diisocyanate-3,3'-dimethyldiphenylmethane
1,5-naphthylenediisocyanate
4,4'-diisocyanate-3,3'-dichlorodiphenylmethane
4,4'-diisocyanate-diphenylether and 2,4-diisocyanate-diphenylether
1,3-phenylenediisocyanate
3,3'-dimethoxy-4,4'-biphenylenediisocyanate
3,3'-diethoxy-4,4'-biphenylenediisocyanate
2,4-tolylenediisocyanate
2,6-tolylenediisocyanate
4-chloro-1,3-phenylenediisocyanate
4,4'-biphenylenediisocyanate
3,3'-dimethyl-4,4'-biphenylenediisocyanate
m-xylylenediisocyanate
1-methyl-3,5-diethyl-2,4-phenylenediisocyanate
diphenyl-4,4-diisocyanate
diphenyl methane-4,4-diisocyanate
4,4-dimethyldiphenyl methane-2,2-diisocyanate
4-methoxy-1,3-phenylene diisocyanate
4 isopropyl-1,3,phenylene diisocyanate
durylene diisocyanate
3,3'-bitolylene-4,4 diisocyanate
1-methyl-3,5-diethyl-2,6-phenylene diisocyanate
4,4'-diisocyanate-2,2-diphenylpropane -
4,4'-diisocyanate-diphenylmethane
4,6-dimethyl-1,3-xylylene diisocyanate
4,4'-diisocyanate-diphenyl
meta-phenylenediisocyanate
and combinations thereof.

17. The method of claim 10 wherein said acid is chosen from the group consisting of adipic, pimelic, suberic, azelaic, sebacic, dimerized unsaturated fatty acids, and combinations thereof.

18. The method of claim 10 wherein said solvent is chosen from the group consisting of dichlorobenzenes, ethylene glycol monoethylether acetate, acetophenone, phenetole, Bis 2-ethoxy ethylether, anisole, veratrole, and combinations thereof.

19. The method of claim 10 wherein the total molar amount of said anhydride and acid reactant is substantially equal to the molar amount of said diisocyanate reactant.

20. The method of claim 10 wherein said reacting steps are terminated by adding solvent to the reaction solution.

21. The method of claim 10 wherein said last mentioned solvent is chosen from the group consisting of phenolic solvents and aprotic solvents.

22. The method of claim 10 wherein said diisocyanate reactant is present in said reaction solution in excess.

* * * * *